United States Patent [19]

Kurlander

[11] 4,086,840

[45] May 2, 1978

[54] HOLLOW WALL FASTENER

[76] Inventor: Robert A. Kurlander, 9175 SW. 77th Ave., Suite 304, Miami, Fla. 33156

[21] Appl. No.: 762,002

[22] Filed: Jan. 24, 1977

[51] Int. Cl.² ............................................. F16B 13/06
[52] U.S. Cl. .......................................... 85/80; 85/70
[58] Field of Search ............... 85/70, 71, 80, 82, 1 JP, 85/61, 3 R, 3 S, 3 K

[56] References Cited

U.S. PATENT DOCUMENTS

| 2,642,253 | 6/1953 | Markowitz | 248/22 X |
|---|---|---|---|
| 2,795,144 | 6/1957 | Morse | 85/1 JP X |
| 3,257,889 | 6/1966 | Fischer | 85/70 |
| 3,348,444 | 10/1967 | Brignola | 85/70 |
| 3,910,588 | 10/1975 | Austin | 85/1 JP X |

FOREIGN PATENT DOCUMENTS

| 188,489 | 1/1957 | Austria | 85/70 |
|---|---|---|---|
| 1,263,923 | 5/1961 | France | 85/1 JP |
| 883,340 | 11/1961 | United Kingdom | 85/1 JP |
| 993,021 | 5/1965 | United Kingdom | 85/1 JP |

Primary Examiner—Ramon S. Britts
Attorney, Agent, or Firm—Phillips, Moore, Weissenberger, Lempio & Majestic

[57] ABSTRACT

A hollow wall fastener comprises a conical member composed of an elastomeric material adapted to collapse when compressed longitudinally. A threaded nut is molded and secured to an apex end of the member to form an integral part thereof and a bolt is threaded in the nut. The member and nut are suitably sized and constructed to be inserted through a hole formed through a wall whereby upon rotation of the bolt the member will be drawn into bearing contact with the blind side of the wall. Alternative embodiments include the addition of an elastomeric sleeve on the bolt, the formation of one or more radial lips internally and/or externally on the member, the addition of longitudinally extending ribs on the member and the formation of two or more conically shaped portions on the member, disposed in tandem relationship relative to each other.

22 Claims, 11 Drawing Figures

HOLLOW WALL FASTENER

BACKGROUND OF THE INVENTION

The advent of blind fasteners, such as a toggle or Moly bolt, has facilitated the attachment of various items externally on a hollow wall. Since the fastening portion of a toggle bolt has a generally rectangular cross section upon collapse thereof, a rectangular hole must be formed in the wall to facilitate insertion of the toggle bolt therethrough. Such a procedure is time consuming and does not always provide a hole having the desired tolerances to assure firm securance of the toggle bolt to the wall. In particular, the hole requires a cross sectional area approximating eight times the cross sectional area of the bolt and since the critical area of stress is located closely adjacent to the hole, the holding efficiency of the toggle bolt becomes less as the hole becomes dimensionally larger.

In addition, the toggle bolt has a pair of pivoted prongs which extend radially outwardly from the nut attached thereto to absorb stresses and to anchor the bolt in place. Thus, the prongs provide limited bearing contact with the blind side of the wall and provide only limited absorption of stresses in a direction perpendicular to the longitudinal axis of the bolt. In short, the prongs essentially provide point contact with the blind side of the wall and the toggle bolt will tend to pull back through the wall when increased loads are imposed thereon in the aforementioned vertical direction. Furthermore, the toggle bolt depends upon a pivoting action which must be precisely controlled to assure contact with the blind side of the wall. In addition, the articulated components of the toggele bolt add to the manufacturing costs thereof over blind fasteners of the semistatic type.

The blind fastener of the Moly type exhibits similar shortcomings. In this type of fastener a bolt is threadably mounted in a nut secured to an end of a cylinder comprising a plurality of longitudinally disposed ribs which tend to spiral and bend in an axial direction upon retraction of the nut towards the head end of the bolt. As is well known in the fastening arts, such a blind fastener is difficult to install and oftentimes pulls outwardly through the hole formed through a wall upon which an item is desired to be attached. Furthermore, this rather complicated type of fastener is relatively expensive to manufacture.

SUMMARY OF THIS INVENTION

An object of this invention is to overcome the above, briefly described problems by providing an economical hollow wall fastener which exhibits a non-complex and rigid construction. The fastener further exhibits a high degree of structural integrity and ability to be installed expeditiously with minimal skill.

The fastener comprises a conical member of circular cross section composed of an elastomeric material, collapsible radially inwardly and also along a longitudinal axis thereof. A threaded nut, preferably circular, is secured to the apex end of the member and a threaded member or bolt is threadably mounted in the nut.

Thus, the adapter may be inserted through a hole, preferably circular, formed in a wall to dispose the nut and conical member on a blind side thereof. Upon rotation of the bolt, the member collapses and folds in a longitudinal direction and is compressed against the blind side of the wall to secure the fastener in place not only by the exerted force, but also with a suction seal. Portions of the member will tend to extrude into the hole and around the bolt to further increase the anchoring and suction sealing desiderata thereof.

In one alternative embodiment of this invention, an elastomeric sleeve is mounted on the shank of the bolt to further aid in providing the above-mentioned anchoring and sealing desiderata. In another embodiment, at least one radial lip is formed on the member, such as internally and/or externally thereon. In another such embodiment, a plurality of longitudinally extending ribs are formed on the member, preferably externally thereon. In addition, the member may be configured to comprise two or more conically shaped portions disposed in tandem relationship relative to each other.

BRIEF DESCRIPTION OF THE DRAWINGS

Other objects of this invention will become apparent from the following description and accompanying drawings wherein.

DETAILED DESCRIPTION

Figures 1, 2:
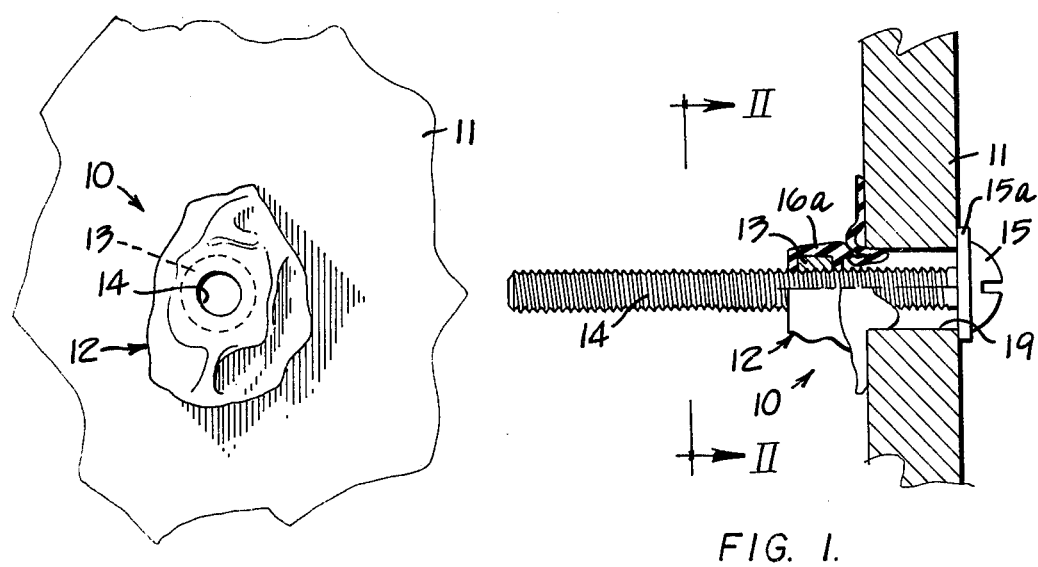
FIG. 1 is a sectional view illustrating the hollow wall fastener of this invention secured to a wall.
FIG. 2 is a plan view of a blind side of the wall, taken in the direction of arrows II—II in FIG. 1, to illustrate the fastener as it would appear in its secured and collapsed position thereon.

FIG. 1 illustrates a hollow wall or blind fastener 10 of this invention shown secured to a wall 11. The fastener comprises a hollow conical member 12 (FIG. 3), shown in its collapsed condition against a blind side of the wall. The fastener further comprises an internally threaded and cylindrical nut 13 having a threaded member or bolt 14 threadably mounted therein with a head 15 of the bolt being disposed on the exposed side of the wall. An annular washer 15a on the shank of bolt 14, which may constitute a separate element or which may be formed integrally on head 15, abuts the exposed side of the wall and has an outside diameter larger than that of head 15.

Figure 3:
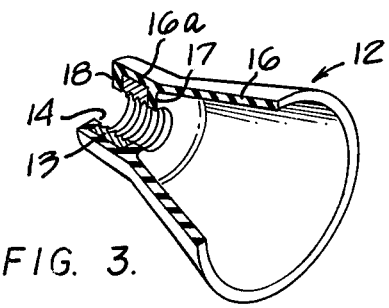
FIG. 3 is a partially sectioned isometric view of a conical member and nut employed in the fastener.

As shown in FIG. 3, sidewall portions 16 of conical member 12 preferably have substantially uniform thicknesses throughout the length thereof. Nut 13 is encapsulated by the apex end of the member whereby a pair of axially spaced flanges 17 and 18 extend radially inwardly on either side of the nut to substantially encapsulate the nut along with a cylindrical extension 16a of wall portions 16. The nut may be bonded to the member by a standard steel-to-rubber adhesive, such as Vulcalock, manufactured by General Latex and Chemical Corporation of Cambridge, Mass. Cylindrical nut 13 and extension 16a are dimensioned slightly smaller than the diameter of a circular hole 19 formed through wall 11 (FIG. 1) to facilitate insertion of the fastener therethrough.

Conical member 12 may be composed of any suitable elastomeric material which will provide the desired physical characteristics whereby wall portions 16 thereof will collapse radially inwardly upon insertion thereof through hole 19 and thereafter expand or spring-back to their original FIG. 3 condition when positioned entirely on the blind side of the wall. The wall portions of the conical member must thereafter collapse and fold in an axial direction, against the wall, upon rotation of bolt 14 to draw nut 13 to its FIG. 1 position. Examples of physical properties of the elastomeric materail are as follows: the tensile strength of the material at 70° F. may be selected from the range of 3,000 to 5,000 p.s.i; the thermal coefficient of linear expansion within the range of from 50° to 140° F. may be selected from the range of from 0.000110 to 0.000125 in./in./° F; and the compression-set characteristics at 70° F. and 400 p.s.i. and for 22 hours may be within the range of from 1.4 to 2.6.

The elastomeric material may be selected from the group consisting of prevulcanized natural rubber latex, vulcanizable neoprene based compounds, natural gum or any suitable thermoplastic or thermosetting synthetic plastic exhibiting physical characteristics of the type described above. A specific example of a suitable prevulcanized natural rubber latex is the Bultex 1-V-110-A material manufactured by General Latex and Chemical Corporation of Cambridge, Mass. This material has a total solids of 60.1±1% and an approximate weight per gallon of 8.2 lbs. The material needs only to be dried below 200° F. to give its optimum properties.

A specific example of a suitable vulcanizable neoprene based compound constitutes Vultex 3-N-51 Black #1, manufactured by the above-named company. This material has a total solids of 48.5±1% and an approximate weight per gallon of 9.6 lbs. The material may be dried overnight at room temperature and then heated for two hours at approximately 158° F., followed by one hour heating at 285° F. to obtain optimum properties.

Figure 4:
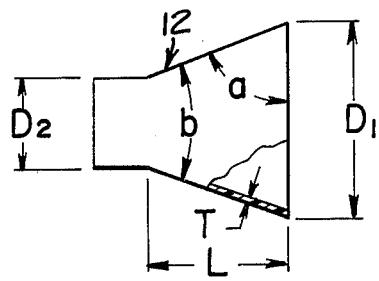
FIG. 4 is a partially sectioned plan view of the conical member, illustrating design parameters thereof.

Referring to FIG. 4, an included base angle a, between the base and sidewall portions of conical member 12, is preferably selected from the range of from 65° to 83° whereas an included cone angle b between such sidewall portions is preferably selected from the range of from 14° to 50° (shown as approximating 40° in FIG. 4). Such angles will assure the insertion of the member through hole 19 (FIG. 1) for installation purposes and the spring-back thereof behind wall 11 for securance purposes. Furthermore, the ratio of base diameter $D_1$ to apex diameter $D_2$ is preferably selected from the range of 1.25 to 4.25. The ratio of the length $L_1$ of the conical member to base diameter $D_1$ thereof is preferably selected from the range of 0.5 to 1.5. Thickness T of sidewall portions 16 of the conical member are preferably selected from the range of from 1/30 second of an inch to ⅛ of an inch for most fastener applications. The axial length of nut 13 should be sufficient so as to permit the nut and conical member to be accommodated within the hollow wall upon installation thereof.

Upon installation of fastener 10 on wall 11, circular hole 19 is first drilled through the wall to have a size slightly larger than the apex end of conical member 12. As discussed below, the hole may be tapped with threads to threadably receive threads (not shown) formed externally on nut 13 and the corresponding threaded configuration assumed by elastomeric extension 16a. The conical member, assuming its expanded configuration illustrated in FIG. 3, would be threadably mounted on bolt 14 at a position substantially leftwardly of that shown in FIG. 1. The nut, bolt and member are then inserted through hole 19 and the bolt is turned in the nut to retract conical member 12 into engagement with the blind side of wall 11.

As shown in FIG. 1, the member will force air out of the conical member to collapse and fold, suction seal and at least partially extrude within the annular clearance defined between bolt 14 and the cylindrical surface portions on wall 11 defining hole 19. It should be noted that hole 19 only requires a cross sectional area which may, for example, constitute only approximately four times the cross sectional area of bolt 14 to thus leave substantial wall mass about hole 19 to aid in stress distribution near this critical area. As discussed above, a conventional toggle bolt requires a hole which is approximately eight times the cross sectional area of the bolt employed therewith to substantially reduce the wall mass and thus fastening efficiency of the toggle bolt when compared with the fastener of this invention.

As further discussed above, deformation of elastomeric conical member 12 and extrusion thereof into hole 19 will in effect replace critical wall mass lost during the drilling of hole 19 to greatly aid in absorbing stresses imposed on bolt 14 in a vertical direction or perpendicular relative to the longitudinal axis of the bolt. In addition, a substantial sealing effect is provided in the hole and between the exposed and blind sides of wall 11. In conclusion, the hollow wall fastener of this invention, exhibiting a high degree of structural integrity and ability to absorb stresses, can be installed expeditiously by workmen having limited skills and is far more economical to manufacture than a number of conventional hollow wall fasteners.

FIGS. 5–11 illustrate modifications of the hollow wall fastener of this invention wherein identical numerals depict corresponding constructions.

Figure 5:
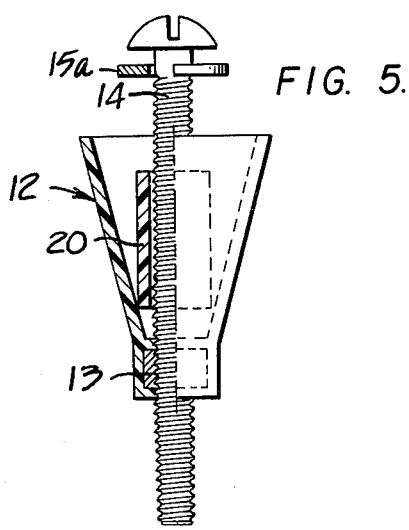
FIG. 5 is a top plan view illustrating a modification of the hollow wall fastener wherein a sleeve is mounted on the shank of a bolt thereof.
Figure 6:
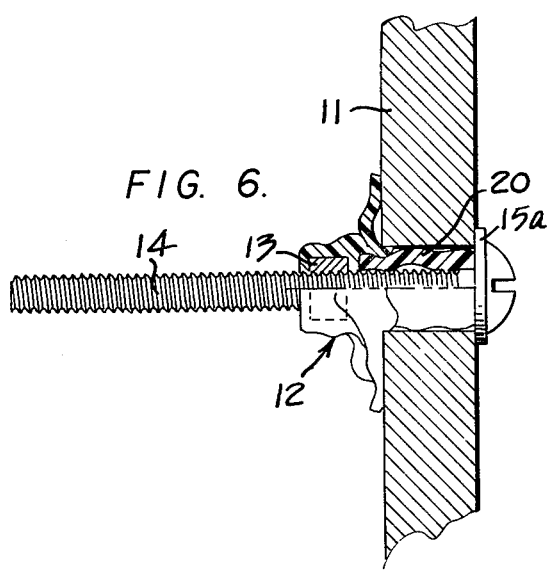
FIG. 6 is a view similar to FIG. 1, but illustrating the FIG. 5 fastener mounted on a wall.

FIGS. 5 and 6 illustrate a modification wherein a cylindrical elastomeric sleeve 20 is mounted on the shank of bolt 14 and has an axial length less than that of the conical member and is confined therein. As shown in FIGS. 6, when the fastener is installed on wall 11, sleeve 20, composed of the same material as the conical member, is at least partially pulled within the annular clearance defined between the wall portions defining hole 19 and bolt 14. This arrangement substantially increases the anchor support and sealing desiderata discussed above.

Figure 7:
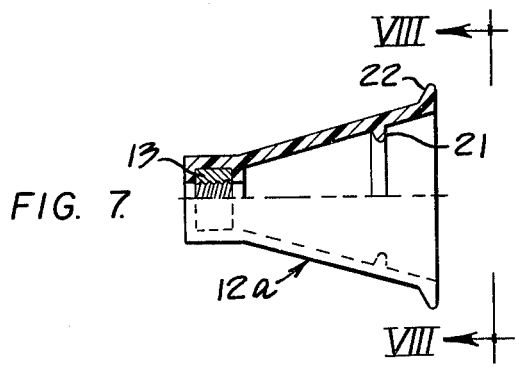
FIG. 7 is a plan view of a modified conical member employed in the fastener, having a pair of radial lips formed integrally thereon.
Figure 8:
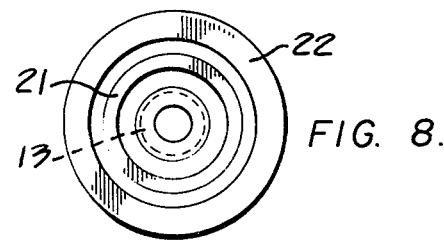
FIG. 8 is a cross sectional view of the FIG. 7 conical member, taken in the direction of arrows VIII—VIII in FIG. 7.
Figure 10:
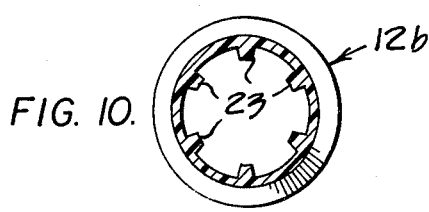
FIGS. 9 and 10 are views similar to FIGS. 7 and 8, respectively, but illustrating a further modification of the conical member, having longitudinal ribs formed internally thereon.

FIG. 7 illustrates a modified conical member 12a having a pair of lips 21 and 22 formed integrally thereon. Lip 21 is formed axially between the apex and base ends of the member and extends radially inwardly from the wall portions thereof. Lip 22 is formed on the base of the member to extend radially outwardly therefrom and cooperates with lip 21 to provide additional structural anchoring for the fastener on wall 11 when secured thereto.

Figure 9:
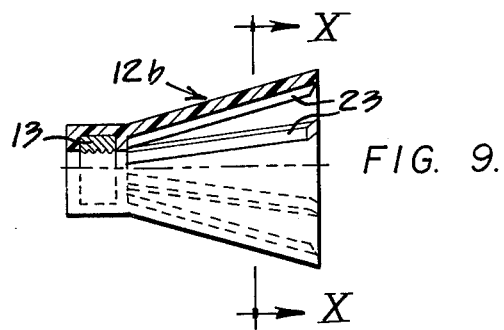

FIG. 9 illustrates a modification 12b of the conical member wherein a plurality (e.g., six) of longitudinally extending and circumferentially spaced ribs 23 are formed integrally on the member. Such ribs aid in increasing the strength of the member and the direction of stress imposed thereon. It should be understood that such ribs could be formed externally on the member, if so desired.

Figure 11:
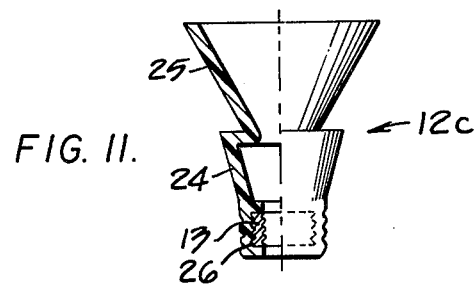
FIG. 11 is a plan view illustrating a still further modification of the conical member wherein a pair of conical portions are formed thereon in tandem relationship.

FIG. 11 illustrates a modified member 12c wherein a pair of conical portions 24 and 25 are formed integrally in tandem relationship thereon. It should be understood that additional conical portions could be formed on member 12c, if so desired. It should be further understood that the design criteria for the conical member, discussed in regards to FIG. 4, also apply to the embodiments illustrated in FIGS. 5-11. FIG. 11 further illustrates external threads 26 formed on nut 13. The thread-like elastomeric material conforming to the external threads, which threads may be also formed on the nuts of the previously described embodiments, are adapted to threadably engage mating threads (not shown) tapped through hole 19 of wall 11 (FIG. 1) to further aid in the above described anchoring and sealing desiderata.

I claim:

1. A blind wall fastener adapted for insertion through a hole formed through a wall comprising
   a hollow conical member composed of an elastomeric material and having thin sidewall portions of substantially uniform thickness throughout axial lengths thereof and collapsible along a longitudinal axis of said member,
   an internally threaded nut secured to an apex end of said member which terminates at said sidewall portions, said sidewall portions collapsible to assume an outside diameter no larger than the outside diameter of the apex end of said member, and
   a threaded member threadably mounted in said nut whereby upon insertion of said blind wall fastener through the hole formed through said wall, the sidewall portions of said member will expand radially outwardly automatically to engage a backside of said wall.

2. The fastener of claim 1 wherein sidewall portions of said conical member have substantially uniform thicknesses throughout axial lengths thereof.

3. The fastener of claim 1 wherein the apex end of said conical member is at least generally cylindrical.

4. The fastener of claim 3 wherein sidewall portions at the apex end of said member substantially encapsulate said nut and are secured thereto.

5. The fastener of claim 1 wherein the included angle between a base end and sidewall portions of said conical member is selected from the range of from 65° to 83°.

6. The fastener of claim 1 wherein the included cone angle between sidewall portions of said conical member is selected from the range of from 14° to 50°.

7. The fastener of claim 1 wherein the ratio of the diameter of a cylindrical base end of said conical member to the diameter of the apex thereof is selected from the range of from 1.25 to 4.25.

8. The fastener of claim 1 wherein the ratio of the length of said conical member to the diameter of a cylindrical base end thereof is selected from the range of from 0.5 to 1.5.

9. The fastener of claim 1 wherein the thickness of sidewall portions of said conical member is selected from the range of from one-thirty second of an inch to one-eighth of an inch.

10. The fastener of claim 1 wherein said nut is cylindrical and wherein an apex end of said conical member substantially encapsulates said nut.

11. The fastener of claim 10 wherein the apex end of said conical member comprises a pair of longitudinally spaced flanges extending radially inwardly from sidewall portions of said conical member and straddling opposite sides of said nut.

12. The fastener of claim 10 wherein said nut has threads formed externally thereon.

13. The fastener of claim 1 wherein the elastomeric material composing said conical member is selected from the group consisting of prevulcanized natural rubber latex, vulcanizable neoprene based compounds, natural gum and synthetic plastics.

14. The fastener of claim 1 further comprising an elastomeric sleeve mounted on a shank of said threaded member and having an axial length less than the axial length of said conical member and disposed within the confines thereof.

15. The fastener of claim 1 further comprising at least one circumferential lip formed integrally with said conical member to extend radially therefrom.

16. The fastener of claim 14 wherein said lip is formed internally of said conical member to extend radially inwardly therefrom.

17. The fastener of claim 15 wherein said lip is formed on a base of said conical member to extend radially outwardly therefrom.

18. The fastener of claim 1 further comprising a plurality of circumferentially disposed ribs formed on said conical member to extend longitudinally thereon.

19. The fastener of claim 18 wherein said ribs are formed internally on said conical member.

20. The fastener of claim 1 further comprising a second conical member having its apex end secured to a base end of said first-mentioned conical member and disposed in tandem therewith.

21. The fastener of claim 1 wherein said threaded member constitutes a bolt having a head formed thereon.

22. The fastener of claim 21 further comprising an annular washer on a shank of said bolt and having an outside diameter larger than the outside diameter of said head.

* * * * *